(12) United States Patent
Cross et al.

(10) Patent No.: US 11,292,933 B2
(45) Date of Patent: Apr. 5, 2022

(54) STABLE OIL-IN-WATER NANOEMULSION CONTAINING UPCONVERTING NANOPARTICLES

(71) Applicant: SOUTH DAKOTA BOARD OF REGENTS, Pierre, SD (US)

(72) Inventors: William Cross, Rapid City, SD (US); Jeevan Meruga, Rapid City, SD (US); Jon Kellar, Rapid City, SD (US); P. Stanley May, Vermillion, SD (US); Aravind Baride, Vermillion, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 516 days.

(21) Appl. No.: 16/248,371

(22) Filed: Jan. 15, 2019

(65) Prior Publication Data

US 2019/0218410 A1 Jul. 18, 2019

Related U.S. Application Data

(60) Provisional application No. 62/617,496, filed on Jan. 15, 2018.

(51) Int. Cl.
| | | |
|---|---|---|
| *C09K 11/77* | (2006.01) | |
| *C09D 11/50* | (2014.01) | |
| *C09D 11/023* | (2014.01) | |
| *C09D 11/037* | (2014.01) | |
| *C09D 11/322* | (2014.01) | |
| *C09D 11/38* | (2014.01) | |
| *B41M 3/14* | (2006.01) | |

(52) U.S. Cl.
CPC ............. *C09D 11/50* (2013.01); *B41M 3/144* (2013.01); *C09D 11/023* (2013.01); *C09D 11/037* (2013.01); *C09D 11/322* (2013.01); *C09D 11/38* (2013.01); *C09K 11/7773* (2013.01)

(58) Field of Classification Search
None
See application file for complete search history.

(56) References Cited

U.S. PATENT DOCUMENTS

| | | | |
|---|---|---|---|
| 5,226,957 | A | 7/1993 | Wickramanayake et al. |
| 5,643,357 | A | 7/1997 | Breton et al. |
| 5,679,724 | A | 10/1997 | Sacripante et al. |
| 6,342,094 | B1 | 1/2002 | Kabalnov |

(Continued)

FOREIGN PATENT DOCUMENTS

WO WO-2014006254 A1 * 1/2014 ............. C01G 49/06

OTHER PUBLICATIONS

Jarzyna et al., Biomaterials 30 (2009) 6947-6954 (Year: 2009).*

(Continued)

*Primary Examiner* — Joshua D Zimmerman
(74) *Attorney, Agent, or Firm* — McKee, Voorhees & Sease, PLC

(57) ABSTRACT

The present technology relates generally to a stable oil-in-water emulsion containing upconverting nanoparticles. In particular, the present technology relates to an ink formulation comprising a stable oil-in-water emulsion of upconverting nanoparticles useful for security printing. Preferably the upconverting nanoparticles comprise a $\beta$-Na(RE)F$_4$ nanoparticle, wherein RE is a lanthanide, yttrium, or a combination or mixture thereof.

20 Claims, 4 Drawing Sheets

(56) References Cited

U.S. PATENT DOCUMENTS

| | | |
|---|---|---|
| 6,432,183 B1 | 8/2002 | Kabalnov |
| 7,115,161 B2 | 10/2006 | Magdassi et al. |
| 7,129,277 B2 | 10/2006 | Baran, Jr. |
| 7,192,472 B2 | 3/2007 | Hermansky |
| 2005/0078158 A1 | 4/2005 | Magdassi et al. |
| 2005/0155516 A1 | 7/2005 | Hermansky |
| 2015/0231282 A1 | 8/2015 | Pozzo et al. |

OTHER PUBLICATIONS

Baride et al., "A NIR-to-NIR upconversion luminescence system for security printing applications", RSC Adv., vol. 5, 10 pages, 2015.

Blumenthal et al., "Patterned direct-write and screen-printing of NIR-to-visible upconverting inks for security applications", Nanotechnology, vol. 23, 10 pages, 2012.

Boström et al., "Extended DLVO theory: Electrostatic and non-electrostatic forces in oxide suspensions", Advances in Colloid and Interface Science, vols. 123-126, pp. 5-15, 2006.

Calvert, Paul, "Inkjet Printing for Materials and Devices", Chem. Mater., vol. 13, pp. 3299-3305, 2001.

Chen et al., "Upconversion Nanoparticles: Design, Nanochemistry, and Applications in Theranostics", Chem. Rev., vol. 114, pp. 5161-5214, 2014.

Cross et al., "Rare-Earth Doped Nanoparticles in Security Printing Applications", Symposium YY, vol. 1471, 5 pages, 2012.

Derby, Brian, "Inkjet Printing of Functional and Structural Materials: Fluid Property Requirements, Feature Stability, and Resolution", Annu. Rev. Mater. Res., vol. 40. pp. 395-414, 2010.

Forte et al., "Electron Microscopy of Negatively Stained Lipoproteins", Methods in Enzymology, vol. 128, pp. 442-457, 1986.

Generalova et al., "PEG-modified upconversion nanoparticles for in vivo optical imaging of tumors", RSC Advances, 19 pages, 2013.

Grasso et al., "A review of non-DLVO interactions in environmental colloidal systems", Re/Views in Environmental Science & Bio/Technology, vol. 1, pp. 17-38, 2002.

Hotze et al., "Nanoparticle Aggregation: Challenges to Understanding Transport and Reactivity in the Environment", J. Environ. Qual., vol. 39, pp. 1909-1924, 2010.

Jarzyna et al., "Iron oxide core oil-in-water emulsions as a multifunctional nanoparticle platform for tumor targeting and imaging", Biomaterials, vol. 30(36), pp. 6947-6954, Dec. 2009.

Meruga et al., "Multi-layered covert QR codes for increased capacity and security", International Journal of Computers and Applications, vol. 37, Issue 1, 4 pages, 2015.

Meruga et al., "Red-green-blue printing using luminescence-upconversion inks", J. Mater. Chem. C., vol. 2, pp. 2221-2227, 2014.

Meruga et al., Security printing of covert quick response codes using upconverting nanoparticle inks, Nanotechnology, vol. 23, 10 pages, 2012.

Najjar, Reza, "Microemulsions—A Brief Introduction", www.intechopen.com, 30 pages, Mar. 16, 2012.

Petersen et al., "Hansen Solubility Parameters of Surfactant-Capped Silver Nanoparticles for Ink and Printing Technologies", Langmuir, vol. 30, pp. 15514-15519, 2014.

Pillai et al., "Applications of Microemulsions in Enhanced Oil Recovery", Handbook of Microemulsion Science and Technology, Chapter 24, 13 pages, 1999.

Saini et al., "Formulation, Development & Evaluation of Oral Fast Dissolving Anti-Allergic Film of Levocetrizine Dihydrochloride", J. Pharm. Sci. & Res., vol. 3(7), pp. 1322-1325, 2011.

Sedlmeier et al., "Surface modification and characterization of photon-upconverting nanoparticles for bioanalytical applications", Chem. Soc. Rev., vol. 44, pp. 1526-1560, 2014.

Singh et al., "Inkjet Printing—Process and Its Applications", Adv. Mater., vol. 22, pp. 673-685, 2010.

Soleimani-Gorgani et al., "Water Fast Ink Jet Print Using an Acrylic /Nano-Silver Ink", Prog. Color Colorants Coat., vol. 4, pp. 79-83, 2011.

Suter II, et al., "Real-Time-Monitoring of the Syntheis of $\beta$-NaYF4:17% Yb,3% Er Nanocrystals Using NIR-to-Visible Upconversion Luminescence", J. Phys. Chem. C., vol. 118, pp. 13238-13247, 2014.

Verwey, E.J.W., "Theory of the Stability of Lyophobic Colloids", J. Phys. Chem., vol. 51(3), pp. 631-636, 1947.

Wang et al., "Upconversion nanoparticles: synthesis, surface modification and biological applications", Nanomedicine: Nanotechnology, Biology and Medicine, vol. 7, Issue 6, pp. 710-729, Dec. 2011.

Wilhelm et al., "Water dispersible upconverting nanoparticles: effects of surface modification on their luminescence and colloidal stability", Nanoscale, vol. 7, pp. 1403-1410, 2015.

You et al., "Inkjet printing of upconversion nanoparticles for anti-counterfeit applications", Nanoscale, 9 pages, Jan. 3, 2015.

\* cited by examiner

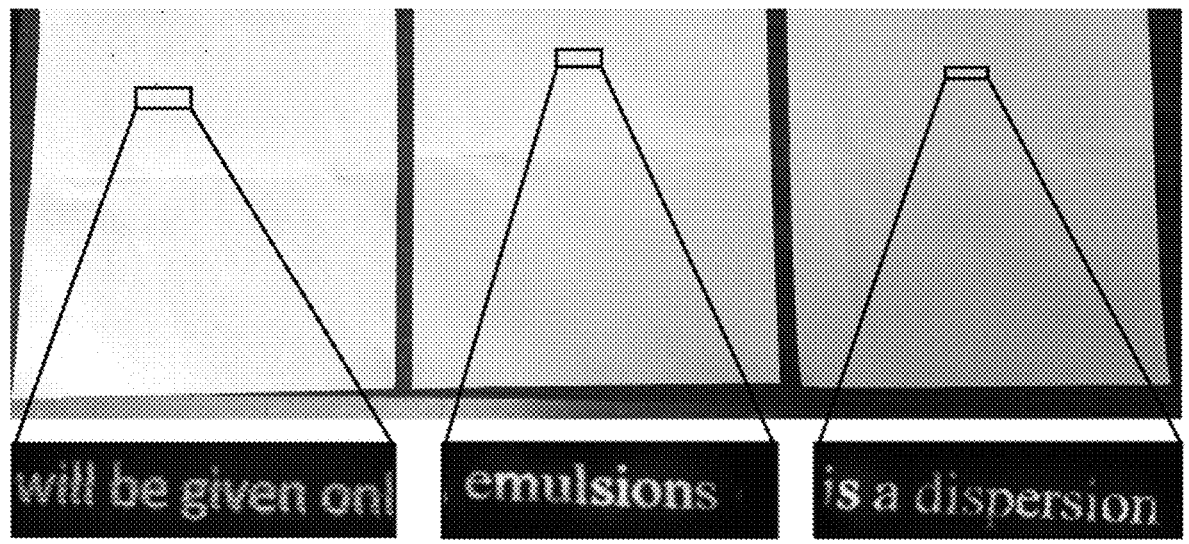
*FIG. 8A*  *FIG. 8B*  *FIG8C*
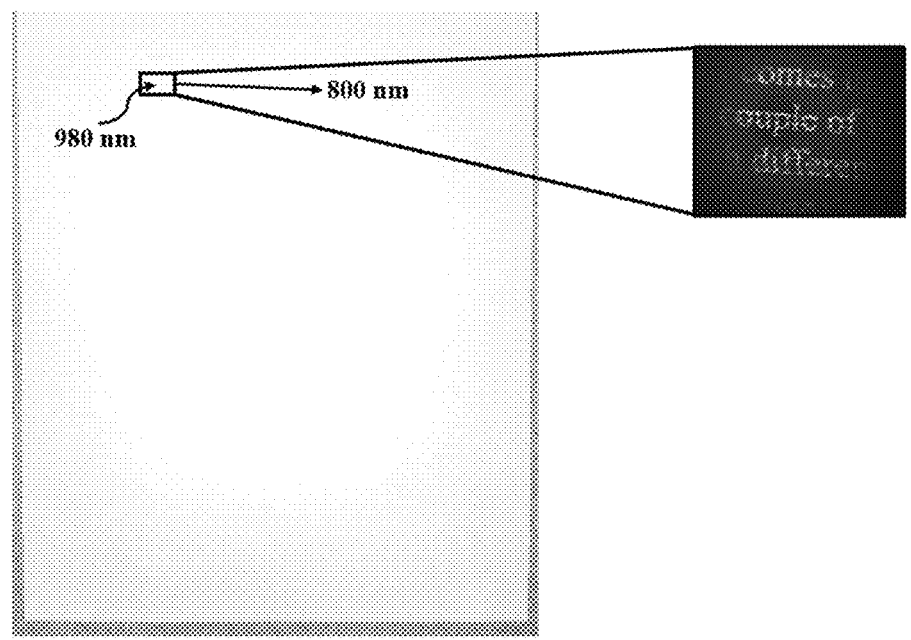
*FIG. 9*

STABLE OIL-IN-WATER NANOEMULSION CONTAINING UPCONVERTING NANOPARTICLES

CROSS-REFERENCE PARAGRAPH

This application claims priority under 35 U.S.C. § 119 of a provisional application Ser. No. 62/617,496, filed Jan. 15, 2018, each of which is hereby incorporated by reference in its entirety.

GRANT REFERENCE

Work for this invention was funded in part by grants from National Science Foundation, Grant No. #1414211, 1560421, and NSF MRI Grant No. CHE-1337707. The United States government may have certain rights in this invention.

FIELD OF THE INVENTION

The present technology relates generally to a stable oil-in-water emulsion containing upconverting nanoparticles. In particular, the present technology relates to an ink formulation comprising a stable oil-in-water emulsion of upconverting nanoparticles useful for security printing.

BACKGROUND OF THE INVENTION

The following description is provided to assist the understanding of the reader. None of the information provided or references cited is admitted to be prior art to the present technology.

Upconverting nanoparticles (UCNPs) of $\beta$-Na(RE)F$_4$ (RE=Y, Lanthanide series elements) have drawn considerable interest for a host of applications, including theranostics and security printing. These applications, and many others, prefer the dispersal of the UCNPs in a water-based and non-toxic medium. Dispersion of UCNPs in a water-based medium presents a challenge, because, as synthesized, $\beta$-Na(RE)F$_4$ nanoparticles are generally coated with oleate capping ligands. These UCNPs disperse well in non-polar solvents, such as hexane or toluene, but must be modified in order to be directly compatible with a polar or aqueous media.

Strategies for obtaining water-dispersible UCNPs include the use of ligand exchange, chemical modification of the native ligands, addition of a second ligand to form a bilayer with the oleates, and coating the UCNP with a suitable polymer. However, it has been found that such strategies produce aqueous dispersions of UCNP that lack long-term stability. In addition, the strategies that involve modification of the UCNP surface often reduce the intrinsic quantum efficiency of upconversion emission.

The printing of latent patterns and codes using inks containing UCNPs are invisible under ambient lighting or UV excitation, but, upon near-infrared (NIR) illumination, become readable as luminescent monochrome, multi-color, or NIR images. For this purpose, the UCNP dispersions in the ink need not only be stable for long periods of time, but must also have relatively high particle loading levels (particularly in comparison with biomedical imaging applications) in order to produce a sufficiently bright luminescent image. These two requirements, high particle loading and long-term stability, are in conflict, and must be carefully balanced to achieve overall printing success. Furthermore, the UCNP dispersions must conform to the requirements (viscosity, surface tension) of the chosen print platform, which generally dictate the addition of chemical modifiers to the aqueous medium. Finally, nanoparticle dispersions are notoriously sensitive to the addition of other solutes, particularly those that increase the ionic strength of the aqueous medium, further adding to the challenges associated with meeting the requirements for security printing.

While UCNP inks can be based on organic solvents, water is the desired solvent for commercial inks. Accordingly, it is an objective of the present technology to develop a stable oil-in-water nanoemulsion of upconverting nanoparticles that has long-term stability, a high nanoparticle load, and does not require surface modification of the UCNP.

Other objects, advantages and features of the present invention will become apparent from the following specification taken in conjunction with the accompanying figures.

BRIEF DESCRIPTION OF THE FIGURES

FIGS. 8A, 8B, and 8C show NIR-to-green upconversion ink (0.3 wt %) on paper printed using an Epson WF-3620 printer to evaluate the stability of the upconversion ink over time. The upper photographs show the printed regions under ambient room lighting. The lower photographs are the NIR-to-green luminescence upconversion images of the printed regions under NIR excitation (980 nm; 20 W/cm$^2$).

FIG. 9 shows NIR-to-NIR (0.3 wt %) ink printed on paper printed using an Epson XP-430 printer. The photograph on the left is the latent print image under ambient lighting. The photograph on the right is the NIR-to-NIR (800 nm) luminescence upconversion images of the printed regions under NIR excitation (980 nm; 1.5 W/cm$^2$).

Figure 1:
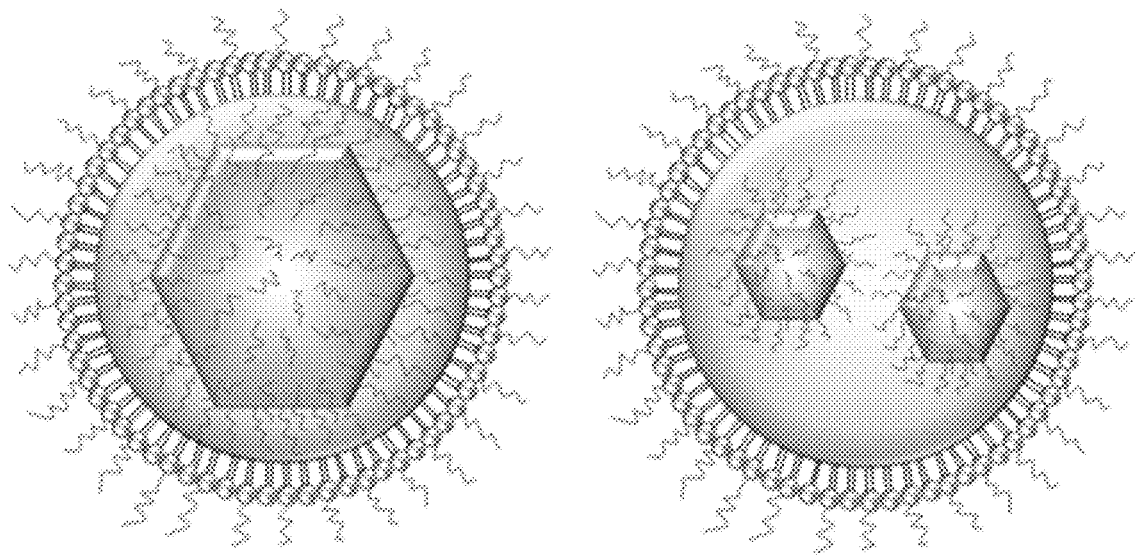
FIG. 1 shows a schematic of UCNPs (hexagonal shaped) residing in the oil phase surrounded by the water-phase of a nanoemulsion.

Various embodiments of the present invention will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

In the following detailed description, reference is made to the accompanying figures, which form a part hereof. In the illustrative embodiments described in the detailed description, figures, and claims are not meant to be limiting. Other embodiments may be utilized, and other changes may be made, without departing from the spirit or scope of the subject matter presented here.

The ink formulation presented in this example is based on an oil-in-water (O/W) emulsion in which the as-synthesized oleate-capped UCNP are encapsulated within the oil droplets of the emulsion. The dispersion and stability of the UCNP-containing oil droplets can be maintained with the help of stabilizing agents that prevent the oil droplets from coagulating and forming a layer on the surface (creaming). A major advantage of this approach is that it requires no modification of the UCNPs, which can be used as-synthesized. An additional advantage to the current approach is that the stabilizing agents are either in the aqueous phase or are attached to the outer surface of the oil droplets, such that they are isolated from the UCNPs. The nanoemulsion approach therefore provides significant flexibility in adjusting the properties (e.g. viscosity, surface tension) of the inks. The resulting inks are quite stable, demonstrating the ability to print covert security features for over a seven-month period.

The present invention relates to ink formulations comprising UCNPs. The ink formulations have many advantages over existing ink formulations comprising UCNPs. For example, ink formulations comprising UCNPs described herein have improved stability and printability.

The embodiments of this invention are not limited to particular applications for UCNP ink formulations, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in the SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

References to elements herein are intended to encompass any or all of their oxidative states and isotopes. For example, if Ytterbium is discussed, such would include $Yb^{II}$ or $Yb^{III}$ and $^{166}Yb$, $^{168}Yb$, $^{169}Yb$, $^{170}Yb$, $^{171}Yb$, $^{172}Yb$, $^{173}Yb$, $^{174}Yb$, $^{175}Yb$, $^{176}Yb$, and $^{177}Yb$ unless otherwise stated.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, and voltage. Further, given solid and liquid handling procedures used in the real world, there is certain inadvertent error and variation that is likely through differences in the manufacture, source, or purity of the ingredients used to make the compositions or carry out the methods and the like. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "analog" means a molecular derivative of a molecule. The term is synonymous with the terms "structural analog" or "chemical analog."

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods and compositions.

As used herein, the term "microemulsion" refers to thermodynamically stable, isotropic dispersions consisting of nanometer size domains of water and/or oil stabilized by an interfacial film of surfactant characterized by ultra-low interfacial tension.

As used herein, the term "nanoemulsion" refers to a dispersion of nano-sized and/or micron-sized droplets of one liquid (the dispersed phase) in another liquid (the dispersion medium/continuous phase) which is immiscible with the first and is kinetically stable. Common emulsions are oil in water (O/W) or water in oil (W/O).

As used herein, the term "oligomer" refers to a molecular complex comprised of between one and ten monomeric units. For example, dimers, trimers, and tetramers, are considered oligomers. Furthermore, unless otherwise specifically limited, the term "oligomer" shall include all possible isomeric configurations of the molecule, including, but are not limited to isotactic, syndiotactic and random symmetries, and combinations thereof. Furthermore, unless otherwise specifically limited, the term "oligomer" shall include all possible geometrical configurations of the molecule.

As used herein the term "polymer" refers to a molecular complex comprised of more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

The term "weight percent," "wt. %," "wt-%," "percent by weight," "% by weight," and variations thereof, as used herein, refer to the concentration of a substance as the weight of that substance divided by the total weight of the composition and multiplied by 100.

Emulsion Compositions

The compositions as described herein include microemulsions and/or nanoemulsions comprising upconverting nanoparticles ("UCNPs"). The microemulsions and nanoemulsions can be O/W variety or W/O variety. Thus, the ink formulations comprise a water-phase component, an oil-phase component, and a UCNP component. Preferably the water-phase of the emulsions comprises an aqueous polyol. Preferably the oil-phase comprises soybean oil. The water-oil interface comprises one or more surfactants.

For the O/W variety, oil is immiscible in water, as such it is preferable to employ energy to form the oil droplets that disperse in water. Preferably, the oil is added dropwise and stepwise. The energy can be applied during and/or after the addition of oil drops. Preferred sources of energy include, but are not limited to, mixing, high-shear mixing, and sonication. In preferred embodiments, the dispersion and stability of the oil droplets can be maintained and/or improved with the help of stabilizing agents that prevent the oil droplets from coagulating to form a layer on the surface of water. The O/W system is designed to stabilize the oil in the water phase with the UCNPs residing (themselves stabilized) within the oil phase. In other words, the oil droplets contain the stabilized UCNP print payload. This approach is exemplified schematically in FIG. 1, which shows the UCNPs (represented as hexagons) in the oil phase of a nanoemulsion, with a water phase surrounding the oil phase.

We have found that the emulsions can be achieved by increasing the repulsive interactions or decreasing the attractive interactions. As decreasing the attractive interactions is difficult, the repulsive interactions are important for improving stabilization. One possible important variable for emulsion stability can be the charge of the discontinuous phase droplets with stability beginning at a droplet charge magnitude of between 20 and 40 mV. Stabilization of emulsions can occur when the interacting droplets have the same charge. In a preferred embodiment, the emulsions disclosed herein have a negative zeta potential. It was also found that stability is affect by steric interactions of the surfactants at the oil-water interface.

Thus, in a preferred embodiment of the emulsion compositions, the oil phase droplets have a charge magnitude of between about 20 mV and about 40 mV. Additionally, in a preferred embodiment of the emulsion compositions, the oil phase droplets have negative zeta potential, i.e., less than 0 mV. Preferably, the emulsion compositions have a surface tension between about 20 mN/m and about 40 mN/m at about 298K. Preferably, the emulsion compositions have a viscosity between about 0.5 cP and about 15 cP at about 298K.

Preferably, the emulsion compositions are suitable for inkjet printing, including, both thermoelectric and piezoelectric inkjet printers. Preferably, the emulsion compositions can be useful for security printing applications.

Oil Phase

The oil phase of the emulsion preferably comprises a fatty acid, a surfactant, or a mixture thereof. Most preferably the oil phase is a mixture of a fatty acid and a surfactant. However, in certain embodiments, the oil phase can comprise, consist essentially of, or consist of a fatty acid.

In an aspect of the emulsions, the oil phase comprises one or more droplets. In a preferred embodiment, the oil phase droplets have negative zeta potential, i.e., less than 0 mV; more preferably the oil phase droplets have a zeta potential of less than about −10 mV, still more preferably less than about −20 mV, most preferably less than about −30 mV.

The oil phase can comprise between about 1 wt. % and about 50 wt. % of the emulsion, more preferably between about 1 wt. % and about 40 wt. % of the emulsion, most preferably between about 1 wt. % and about 20 wt. % of the emulsion.

Fatty Acid

Preferably, the fatty acid is a C14-C20 saturated, mono-unsaturated, polyunsaturated fatty acid, or mixture thereof. In a most preferred embodiment, the fatty acid is soybean oil or a soybean oil derivative. Suitable fatty acids can be naturally derived or synthetic.

The fatty acid can comprise between about 0 and about 100 wt. % of the oil phase (not including the UCNPs), preferably between about 1 wt. % and about 95 wt. % of the of the oil phase (not including the UCNPs), more preferably between about 5 wt. % and about 90 wt. % of the oil phase (not including the UCNPs), and most preferably between about 15 wt. % and about 80 wt. % of the oil phase (not including the UCNPs).

Surfactant

Preferably, the oil comprises a surfactant. Suitable surfactants include, but are not limited to, a phospholipid, a sorbitan ester, a polysorbate, or a mixture or combination thereof. In a preferred embodiment, the surfactant comprises, consists essentially of, or consists of a sorbitan ester and/or polysorbate.

Phospholipid

The oil phase can comprise a phospholipid surfactant. Preferably, the phospholipid is one comprised of Formula I, an analog of Formula I, Formula II, an analog of Formula II, or mixture thereof.

FORMULA I

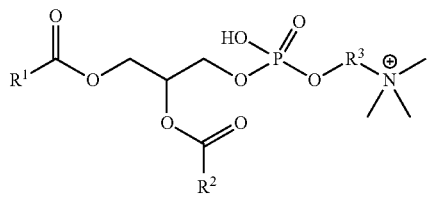

wherein $R^1$ and $R^2$ are independently $C_8$-$C_{25}$ alkyl, alkenyl, or alkynyl group; and wherein $R^3$ is a $CH_2$, $CH_2CH_2$, $CH_2CH_2CH_2$, or $CH_2CH_2CH_2CH_2$ group. In a preferred embodiment, $R^1$ and $R^2$ are the same. In a preferred embodiment, $R^1$ and $R^2$ are a linear $C_{14}$-$C_{20}$ alkyl group. In a more preferred embodiment, $R^1$ and $R^2$ are the same linear $C_{17}$ alkyl group. In a preferred embodiment $R^3$ is a $CH_2CH_2$. In a most preferred embodiment, the phospholipid is 1,2-distearoyl-sn-glycero-3-phosphocholine (DSPC).

FORMULA II

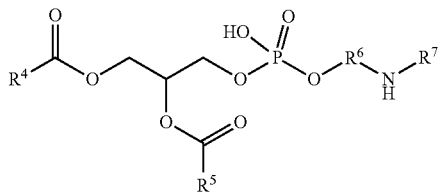

wherein $R^4$ and $R^5$ are independently a $C_8$-$C_{25}$ alkyl, alkenyl, or alkynyl group; $R^6$ is a $CH_2$, $CH_2CH_2$, $CH_2CH_2CH_2$, or $CH_2CH_2CH_2CH_2$, or $—(OCH_2CH_2)_n OH$ where n is an integer of 1-20; and $R^7$ is a polyethylene, polypropylene, or methoxyopolyethylene group. In a preferred embodiment, $R^4$ and $R^5$ are the same. In a preferred embodiment, $R^4$ and $R^5$ are a linear $C_{14}$-$C_{20}$ alkyl group. In a more preferred embodiment, $R^4$ and $R^5$ are the same linear $C_{17}$ alkyl group. In a preferred embodiment $R^6$ is a $CH_2CH_2$ or $—(OCH_2CH_2)_n OH$ where n is an integer of 1-20. In a most preferred embodiment, the polyethylene glycol amine is polyethylene glycol-distearoylphosphatidylethanolamine (PEG-DSPE).

The phospholipid can comprise between about 0 and about 50 wt. % of the oil phase (not including the UCNPs), preferably between about 0.1 wt. % and about 30 wt. % of the of the oil phase (not including the UCNPs), more preferably between about 0.2 wt. % and about 15 wt. %, yet more preferably between about 0.5 wt. % and about 10 wt. % of the oil phase (not including the UCNPs), and most preferably between about 1 wt. % and about 5 wt. % of the oil phase (not including the UCNPs).

Sorbitan Esters and Polysorbates

The oil phase can comprise a sorbitan ester surfactant, polysorbate surfactant, or combination or mixture thereof. Preferably, the sorbitan ester is a sorbitan ester having a carbon chain length of between about 12 and about 18 carbons. Preferred sorbitan esters have a carbon chain length of between about 12 and about 18 carbons, include, but are not limited to, sorbitan monolaureate, sorbitan stearate, sorbitan tristearate, sorbitan oleate, sorbitane trioleate, and combinations or mixtures thereof. Suitable sorbitan esters include those sold under the commercial name SPAN by Sigma Aldrich, including but not limited to SPAN®-20, SPAN®-60, SPAN®-65, SPAN®-80, and SPAN®-85.

Preferred polysorbates include those of Formula III below:

FORMULA III

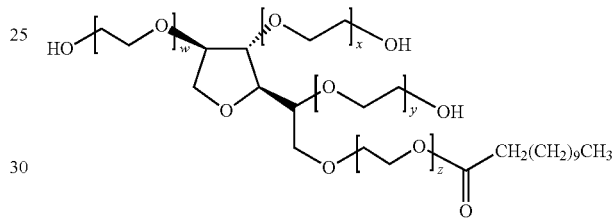

wherein each of w, x, y, and z is an integer between 1 and 40, and wherein the sum of w+x+y+z is between about 20 and about 85. Preferably, the sum of w+x+y+z is 20, 60, 65, 80, or 85, most preferably 80. Exemplary polysorbatin esters are sold under the commercial name TWEEN by Sigma Aldrich, including, but not limited to, TWEEN®-20, TWEEN®-60, TWEEN®-65, TWEEN®-80, and TWEEN®-85.

The sorbitan ester and/or polysorbate can comprise between about 0 and about 100 wt. % of the oil phase (not including the UCNPs), preferably between about 0.1 wt. % and about 80 wt. % of the of the oil phase (not including the UCNPs), more preferably between about 0.2 wt. % and about 75 wt. %, yet more preferably between about 0.5 wt. % and about 70 wt. % of the oil phase (not including the UCNPs), and most preferably between about 1 wt. % and about 65 wt. % of the oil phase (not including the UCNPs).

Water Phase

The water phase of the emulsion preferably comprises water, a water miscible liquid, or a mixture thereof. The water phase can comprise between about 50 wt. % and about 90 wt. % of the emulsion, more preferably between about 50 wt. % and about 85 wt. % of the emulsion, most preferably between about 50 wt. % and about 80 wt. % of the emulsion.

Preferred water miscible liquids include polyols, more preferably polyols containing from about 2 to about 6 carbon atoms, are the molecules that contain 2 or more hydroxyl (—OH) groups. Suitable polyols that can be used in the cleaning composition according to the disclosure include those molecules containing 2 to 6 carbon atoms and 2 to 6 hydroxyl groups, e.g., propylene glycol, ethylene glycol, glycerine, or 1,3-propanediol. In some embodiments, the polyol of the emulsions is propylene glycol. In some other embodiments, the polyol of the emulsions is glycerine. In yet some other embodiments, the polyol of the emulsions is a mixture of two or more polyols, more preferably of three or more polyols.

Water can comprise between 0 wt. % and about 100 wt. % of the water phase, preferably between about 1 wt. % and about 99 wt. %, more preferably between about 5 wt. % and about 95 wt. %, and most preferably between about 10 wt. % and about 90 wt. %. A water miscible liquid (for example a polyol) can comprise between 0 wt. % and about 100 wt. % of the water phase, preferably between about 1 wt. % and about 99 wt. %, more preferably between about 5 wt. % and about 95 wt. %, and most preferably between about 10 wt. % and about 90 wt. %.

Upconverting Nanoparticles (UCNPs)

The emulsions comprise upconverting nanoparticles (UCNPs). Preferred UCNPs comprise rare earth elements, a lanthanide, yttrium, or a combination or mixture thereof. Preferred UCNPs comprise one or more of the following elements: erbium (Er), yttrium (Y), thulium (Tm), and ytterbium (Yb). A preferred upconverting nanoparticle β-Na(RE)$F_4$, where RE is a lanthanide series element or yttrium. Most preferably, the UCNP comprises β-Na(RE)$F_4$ wherein RE comprises erbium, yttrium, thulium, or ytterbium. In a preferred embodiment, the UCNP is a lanthanide-doped 3-NaYF$_4$ nanoparticle. Preferably the UCNP has at least one dimension of less than about 1000 nm, more preferably less than about 500 nm, most preferably less than about 100 nm. In a preferred embodiment, the UCNPs are capped with a fatty acid or fatty acid salt. Preferred fatty acids for capping the UCNPs include, but are not limited to fatty acids (and their salts) having a carbon chain of between 8 and 24 carbons, more preferably between 12 and 22 carbons, most preferably between 16 carbons and 20 carbons. In a most preferred embodiment, the UCNPs are capped with oleic acid.

The UCNP can be present in the emulsions from about 0.1 wt. % to about 20 wt. %, more preferably between about 0.5 wt. % and about 20 wt. %, most preferably between about 1 wt. % and about 20 wt. %. In a preferred embodiment, the UCNP is in the oil phase and in a concentration of between about 1 and about 30 wt. % of the oil phase, more preferably between about 5 and about 30 wt. % of the oil phase, most preferably between about 10 and about 30 wt. % of the oil phase.

Additional Constituents

The emulsions can optionally comprise one or more additional ingredients. Additional ingredients can be added to provide particular properties and/or functions. Additional ingredients may depend on the intended ink functionality. Additional components, can include, but are not limited to, biocides, dyes, humectants, particles/pigments, preservatives, a secondary surfactant, or combination thereof.

Biocide

The emulsions can optionally comprise one or more biocides. Preferred biocides include but are not limited to isothiazolinones, such as benzisothiazolinone, butylbenzisothiazolinone, chloromethylisothiazoninone, dichlorooctylisothiazolinone, methylisothiazolinone, octylisothiazolinone.

Secondary Surfactant

The emulsions preferably comprise a secondary surfactant. In an aspect of the compositions, a secondary surfactant can be added as a stabilizing agent. In an aspect of the emulsions, the secondary surfactant can be employed to reduce the surface tension of the emulsion to improve the printability of the emulsion compositions. Thus, a secondary surfactant can be added as a stabilizing agent and/or for other surface-active properties. A secondary surfactant can be added to the oil phase, water phase, or both to the water phase and oil phase. If a secondary surfactant is added to both the oil and water phases, the secondary surfactant may be the same or different.

Suitable secondary surfactants for including in the emulsions include nonionic, cationic, anionic, amphoteric, zwitterionic, and mixtures of the same. Preferred secondary surfactants, include, but are not limited to, anionic surfactants, lipid-based surfactants, and mixtures thereof. Preferred anionic surfactants include, but are not limited to, alkyl sulfates. Preferred alkyl sulfates include, but are not limited to, linear alkyl sulfates, linear alkyl benzene sulfate, dodecyl sulfate, dodecyl benzene sulfate, and combinations thereof. A most preferred surfactant is sodium dodecyl sulfate.

In a preferred embodiment, a secondary surfactant is an anionic surfactant and is added with the oil phase, the water phase, or both.

If the emulsions comprise a secondary surfactant, the secondary surfactant is preferably in an amount between about 0.01 wt. % and about 10 wt. % of the emulsion, more preferably between about 0.1 wt. % and about 5 wt. % of the emulsion, and most preferably between about 0.2 wt. % and about 5 wt. % of the emulsion.

Methods of Preparing the Emulsion Compositions

The emulsion compositions can be prepared by contacting an aqueous composition with an oil phase composition to form an emulsion. The aqueous composition forms the water phase of the emulsion. Preferably, the oil phase comprises upconverting nanoparticles. Preferably, the oil phase is added dropwise to the aqueous composition during the contacting step. Preferably energy is added during or after the contacting step. For example, the aqueous composition can be heated before, during or after the contacting step. Additionally, the sonication can be applied during or after the contacting step. Preferably the aqueous composition is at a temperature between about 65° F. and 212° F. Preferably, the aqueous composition is at temperature of less than its boiling temperature. After the contacting step, it is preferred that the emulsion composition have a resting step where it is left standing undisturbed for a period of time, preferably at least about 1 minute, more preferably at least about 10 minutes, still more preferably at least about 15 minutes, even more preferably at least about 30 minutes, most preferably at least about 1 hour. In an embodiment, the emulsion composition can be cooled, preferably to room temperature.

Additional ingredients (e.g., a secondary surfactant, a biocide, a dye, a pigment) can be added to the emulsion compositions after the contacting and/or resting step. In another embodiment, one or more additional ingredients is added during the contacting step or to either the aqueous composition or oil phase prior to the contacting step.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Synthesis and Characterization of Some Exemplary UCNPs.

All chemicals were used as received without further purification. Yttrium oxide 99.9%, Ytterbium oxide 99.9%, Erbium oxide 99.9%, Thulium oxide 99.9%, Oleic acid (OA) and 1-Octadecene (1-ODE) are from Alfa-Aesar, Glacial acetic acid from Pharma Co., Ammonium fluoride and Sodium hydroxide are from Fisher Scientific.

Oleate-capped 3-Na(RE)F$_4$ UCNPs were synthesized using a two-step, one-pot procedure. The first step is precursor solution synthesis and the second step is nanoparticle synthesis. The precursor solution was prepared by converting lanthanide oxides into lanthanide oleates and the UCNP synthesis was performed as described by Suter et al. (Suter, J. D.; Pekas, N. J.; Berry, M. T.; May, P. S., Real-time-monitoring of the synthesis of β-NaYF$_4$: 17% Yb, 3% Er nanocrystals using NIR-to-visible upconversion luminescence. *The Journal of Physical Chemistry C* 2014, 118 (24), 13238-13247).

Three exemplary UCNPs in this example were made with a similar procedure, but they are different from each other in terms of ingredients. Green emitting UCNPs are doped with 17% Yb and 3% Er and NIR UCNPs are doped with 48% Yb and 2% Tm in a host 3-NaYF$_4$ nanocrystals. The doping composition of the NIR-to-green upconversion particles is 3-NaYF$_4$:17% Yb, 3% Er. The doping composition of the NIR-to-NIR upconversion particles is β-NaYF$_4$:48% Yb, 2% Tm. The phase purity (β phase) was confirmed using powder XRD (Rigaku Ultima IV).

In a 100 mL flask, accurately weighed lanthanide oxides were added to a 50 mL solution of 1:1 glacial acetic acid and water, and refluxed overnight to convert the lanthanide oxides to lanthanide acetates. For green UCNPs: 2.8 mmol of Y$_2$O$_3$ (632.3 mg), 0.63 mmol of Yb$_2$O$_3$ (248.3 mg), 0.07 mmol of Er$_2$O$_3$ (26.8 mg). For NIR UCNPs: 1.75 mmol of Y$_2$O$_3$ (395.2 mg), 1.68 mmol of Yb$_2$O$_3$ (662.1 g), 0.07 mmol of Tm$_2$O$_3$ (27.0 mg). The lanthanide acetates were further treated with 28 mL of oleic acid (OA) under vacuum and heating (40-70° C.) to form lanthanide oleate by removing water and acetic acid. To the cooled lanthanide oleate reaction mixture 14 mL of 1-ocatadecene is added followed by addition of 28 mmol (1.37 g) of NH$_4$F dissolved in methanol and 14 mmol (560 mg) of NaOH dissolved in methanol. Vacuum and heating is simultaneously applied to remove methanol. After removal of methanol, the vacuum is replaced with a gentle flow of nitrogen gas and the reaction temperature is ramped to 320° C. The reaction is continued for another 90 minutes at 320±2° C. and then cooled to room temperature. The UCNPs are washed by precipitating with acetone and re-dispersing in toluene. The UCNPs are dried under vacuum at 65° C. before further use.

Figure 2:
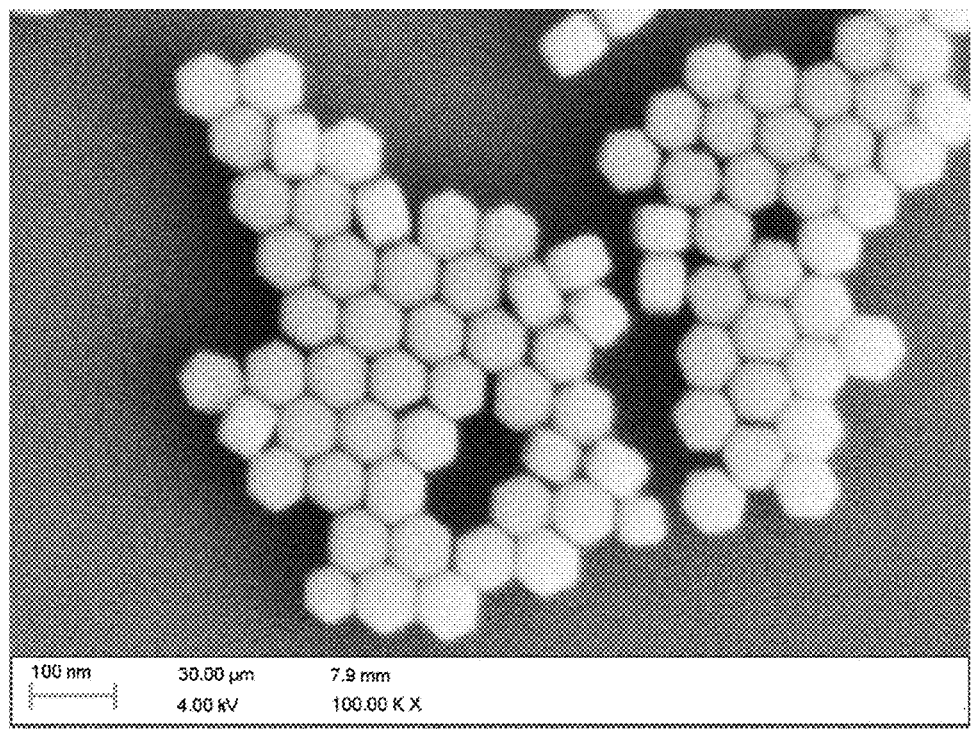
FIG. 2 shows a scanning electron microscope (SEM) image of as-synthesized $\beta$-NaYF$_4$: 48% Yb, 2% Tm UCNP (hexagonal shaped).

The size and morphology of the as-synthesized UCNP were characterized using transmission electron microscopy (TEM) (FEI Technai Spirit/120 kV) and FE-SEM (Zeiss Sigma). Two green UCNP sizes were manufactured, one β-NaYF$_4$: 17% Yb, 3% Er UCNP has a dimension of 73.7±2.0 nm×32.0±2.3 nm, while the other β-NaYF$_4$: 17% Yb, 3% Er UCNP has a dimension of 48.7±3.8 nm×34.1±6.7 nm. The NIR emitting β-NaYF$_4$: 48% Yb, 2% Tm UCNP has a dimension of 75.5±2.4 nm×54.8±3.2 nm. FIG. 2 shows the SEM image of the 3-NaYF$_4$: 48% Yb, 2% Tm UCNP.

Example 2

Emulsions/Ink Preparation and Characterization

Without limiting the disclosed technology, the main mechanisms for emulsion destabilization are 1) sedimentation as larger or higher density material settles, 2) aggregation of dispersed phase droplets that then act collectively as a larger unit, which, if large enough, will settle, and 3) coalescence, in which dispersed phase droplets merge to form larger droplets, which will settle once the coalesced droplets reach a critical size. The forces between droplets are important for the second and third mechanisms, therefore understanding and control thereof is critical to maintain a stable emulsion. Examination of extended Derjaguin-Landau-Verwey-Overbeek (DLVO) theory also indicates that emulsion stabilization can be achieved by increasing the repulsive interactions or decreasing the attractive interactions. As decreasing the attractive interactions is difficult, the repulsive interactions are critical to stabilization. One important variable for emulsion stability was the charge of the discontinuous phase droplets. It was realized that a droplet charge of between 20 and 40 mV was associated with stability. In addition, it was also realized that stability can be achieved through steric interactions of the specific surfactants at the oil-water interface.

In this example, a stable and suitable oil-in-water ink composition for inkjet desktop printers was prepared. In this preparation, the dispersion and stability of the oil droplets can be maintained with the help of one or more stabilizing agents that prevent the oil droplets from coagulating to form a layer on the surface of water. A stabilizing agent, can include, but is not limited to, a simple inorganic electrolyte, surfactant, macromolecule or combination thereof. The oil-in-water composition in this example is designed to stabilize the oil in the water phase with the UCNPs residing (themselves stabilized) within the oil phase. In other words, the oil droplets contain the stabilized UCNP print payload. This approach is shown schematically in FIG. 1.

An ink composition suitable for inkjet desktop printers has to meet the viscosity and surface tension requirements. Thus, formulations intended to meet such parameters were prepared, which had a stable UCNP dispersion. Those formulations had an initial ink 'water base' is 70-80% de-ionized (DI) water, 20-30% glycerin (99.5% active from Humco™) and 0.2-0.5 wt % of sodium dodecyl sulfate (SDS, MP Biomedicals, LLC.). Glycerin increases the viscosity and SDS decreases the surface tension of the emulsion. The 'oil base' contains the soybean oil, UCNPs at desired amount, and two lipids, 1,2-distearoyl-sn-glycero-3-phosphocholine (DSPC, 99% active from Avanti Polar Lipids) and poly(ethylene glycol)-distearoylphosphatidylethanolamine (PEG-DSPE, 99.4% active from NOF American Corporation), which act as surfactants to stabilize the soybean oil in water. Table 1 shows the stock solution amounts used as well as the amounts used in the oil phase composition.

TABLE 1

Stock and Emulsion Solution Concentrations of Oil Phase Components.

| Component | Stock Solution | Emulsion (~2.8 mL) |
|---|---|---|
| DSPC | 0.025 g/mL in chloroform | 2.8 mg of DSPC = 0.112 mL of stock solution |

TABLE 1-continued

Stock and Emulsion Solution Concentrations of Oil Phase Components.

| Component | Stock Solution | Emulsion (~2.8 mL) |
|---|---|---|
| PEG-DSPE | 0.1 g/mL in chloroform | 10 mg of PEG-DSPE = 0.1 mL of stock solution |
| Soybean Oil | 0.5 g/mL in chloroform | 38 mg of soybean oil = 0.076 mL of stock solution |
| UCNPs | 0.1 g/mL in chloroform | 9 mg of UCNPs = 0.09 mL of stock solution |

The procedure for creation of the oil phase portion of the ink is as follows. Stock solutions of all of the oil phase components in chloroform were made as per the values in Table 1. The stock solutions were added and mixed the stock given in Table 1. A 2.8 mL base solution was made with 80% DI water+20% glycerin. This solution was added drop wise to the stirring and (373K) boiling base solution. The solution was homogenized by sonicating for about 20 minutes using a thin tip Cole-Parmer® 750-Watt Ultrasonic Processor while cooling with room temperature water. The desired amount of SDS was added to reduce the surface tension.

The oil phase mixture was added dropwise to the stirring and boiling ink base (DI water+glycerin). The chloroform partially evaporates as the stock solution mixture is added to the ink base. The emulsion solution was sonicated while cooling to room temperature. This results in the water-based UCNP nanoemulsion, with water as the continuous phase. The desired outcome was one where the UCNPs reside in the dispersed oil droplets which are stabilized by surfactants. SDS is added to reduce the surface tension of the emulsion for printing purposes.

The emulsions were left in the vials undisturbed for 24 hours to allow the settling of some the materials that did not emulsify. This approach was selected in preference to filtration, because attempts to filter the emulsion using a 0.2 m pore sized filter resulted in significant loss of UCNP.

Figure 3:
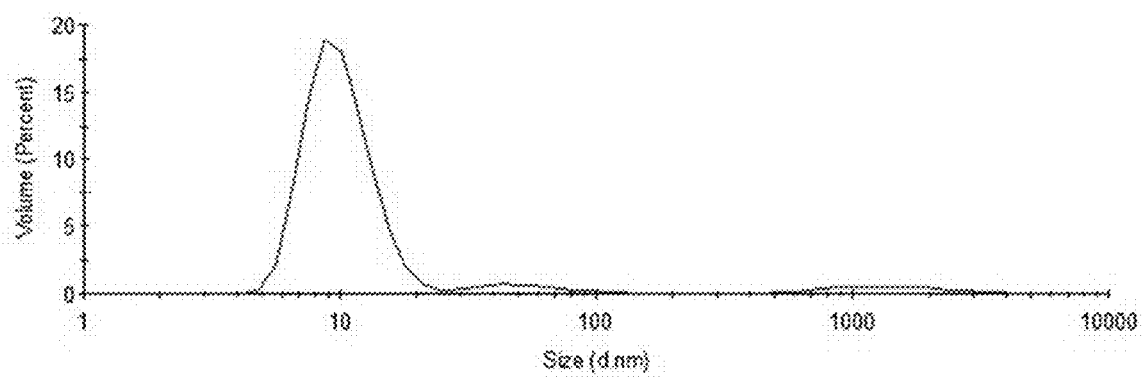
FIGS. 3-4 show dynamic light scattering (DLS) volume distribution data for UCNPs in toluene (FIG. 3) and in emulsion compositions prepared according to Example 2 (FIG. 4).

The emulsions produced were characterized by visual inspection, dynamic light scattering (DLS), zeta potential measurements, and TEM. The emulsion immediately after forming appeared as a white, turbid mixture, suggesting the presence of at least some particles on the order of microns. Dynamic light scattering (DLS) measurements were also performed of the UCNPs in toluene as a control for comparative purposes. While DLS results are useful for comparative purposes, they should not be considered quantitative as the particles are hexagonal prisms whose rotational motion will contribute to the scatter signal and the autocorrelation analysis assumes spherical particles and that the time-dependent scatter fluctuations are due solely to rotational motion. However, because the same UCNPs were tested in both instances, they are expected to have scattered similarly, and thus, the comparison can be effectively drawn between the UCNPs in toluene (as a control) and in the emulsion compositions described herein. The UCNPs tested were (β-NaYF$_4$: 17% Yb, 3% Er UCNP of dimensions 48.7±3.8 nm×34.1±6.7 nm). The DLS results for the volume distribution of the native NIR-to-Green UCNPs in toluene are shown in FIG. 3 and the UCNPs in the emulsion compositions prepared as described above are shown in FIG. 4.

Figure 4:
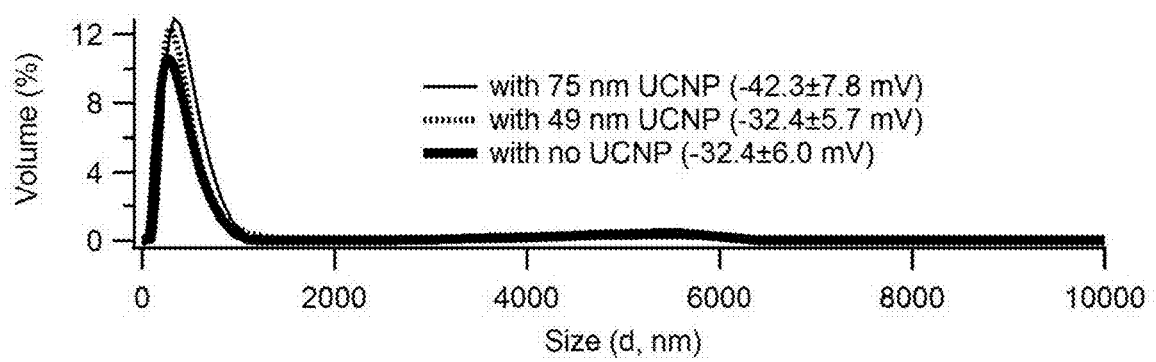
Figure 5:
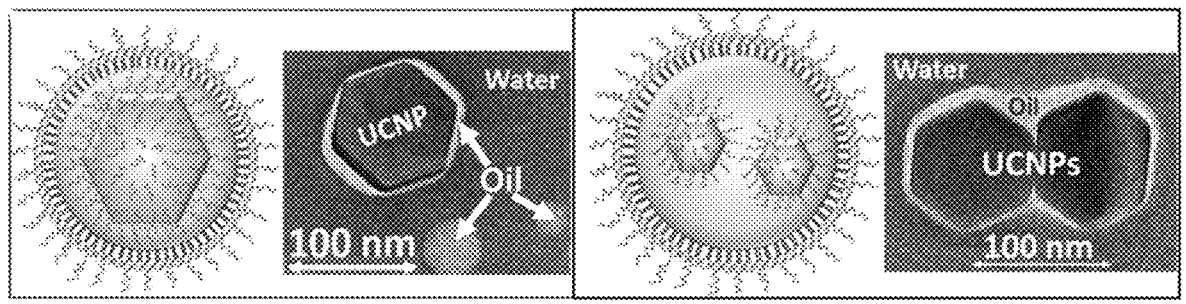
FIG. 5 shows schematic representations and transmission electron microscopy (TEM) images of soybean oil droplets containing one and two UCNPs.

The distribution indicates significant polydispersity, and the main peak would indicate smaller UCNP diameters than were established via SEM (FIG. 5). The distribution was found to be very different from the UCNPs in the emulsion as shown in FIG. 4. This representation gives the relative contribution of each particle size to the total volume of the droplets. The DLS analysis in FIG. 3, however, may not be quantitatively accurate, since the UCNP are hexagonal prisms, whereas the autocorrelation analysis used to generate FIGS. 4 and 5 assume spherical particles. In FIG. 4, the main DLS peak occurs at a hydrodynamic diameter of 68.1 nm. The dimensions of the UCNP used to prepare the emulsion were 73.7±2.0 nm×32.0±2.3 nm, which indicates that the majority of droplets are capable of containing one, and only one, UCNP. The larger size (>1000 nm hydrodynamic radius) particles are likely aggregates of the oil phase that drop out of the emulsion within a day of formulation. These larger droplets are presumably responsible for the observed turbidity of the emulsion.

The zeta potential of the oil phase is given in FIG. 4 and was measured after dilution of the emulsion and found to be in the −20 to −40 mV range desired. This value is similar in magnitude to that found by Jarzyna et al. which ranged from −30 to −55 mV, depending on the emulsion oil phase size. For the size closest to that found herein, the zeta potential determined by Jarzyna et al. was −39.5±1.5 mV.

To determine the location of the UCNP in the nanoemulsion, a negative-stain TEM grid of the UCNP nanoemulsion was prepared following procedure. 200 μL of the UCNP nanoemulsion was added to 2 mL of an aqueous buffer solution consisting of 0.125 mM ammonium acetate, 2.6 mM ammonium carbonate, and 0.26 mM tetrasodium EDTA. A drop of the resulting mixture was placed on a TEM grid, and allowed to rest for 20 seconds, followed by removal of excess solution with filter paper. Then, a drop of 2 wt % aqueous sodium phosphotungstate solution was deposited on the grid and allowed to rest for 20 seconds. Excess solution was then removed, and the sample was imaged. The results are shown in the SEM image in FIG. 5, of the UCNP used to prepare this emulsion is shown in FIG. 2.

The two images on the left show a schematic representation and corresponding TEM image of an oil droplet containing one UCNP. As discussed above, DLS data indicates that the majority of the UCNP are in droplets of this type. The TEM image on the left also shows two small oil droplets with no UCNP. The two images on the right show a schematic representation and corresponding TEM image of an oil droplet containing two UCNP. The TEM images in FIG. 5 clearly shown that the UCNP reside within the oil droplets of the emulsion.

Thermogravimetric analysis (TGA) was performed on an ambient ink sample to help understand the thermal behavior and characterize the composition of the formulation. This analysis was used as the basis for the stability testing procedure described in the following section. Thermogravimetric analysis (TGA) of the ink samples was conducted with a TAQ500 TGA. Approximately 30 mg of the ink emulsions were pipetted onto a platinum TGA sample holder and heated from room temperature to 875K in air flowing at 60 mL/min.

Figure 6:
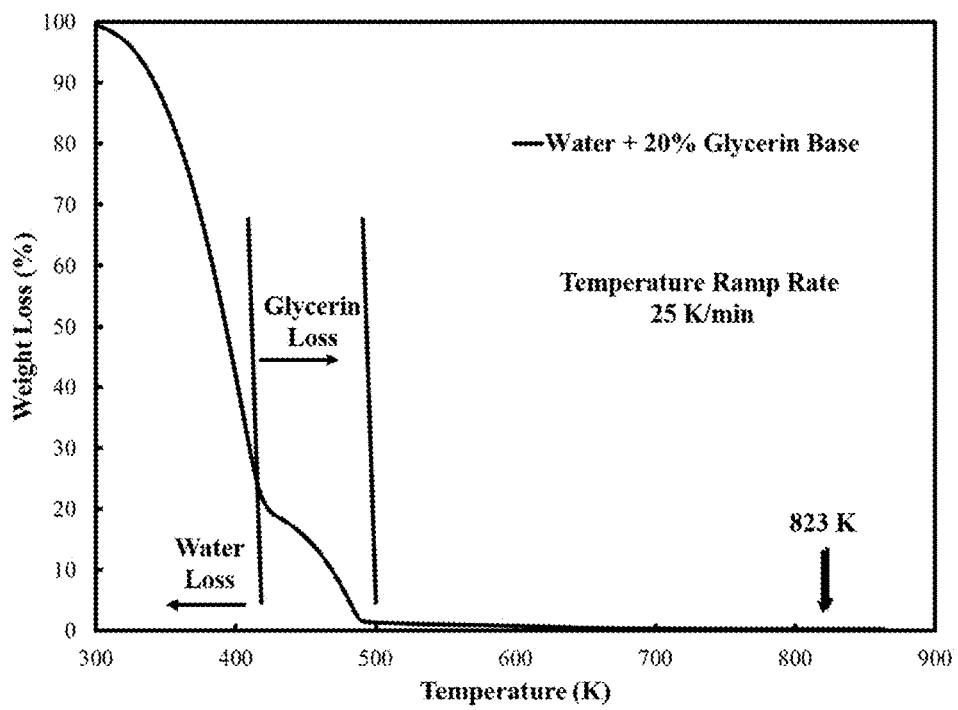
FIG. 6 shows thermogravimetric analysis (TGA) of an ink sample.

As shown in FIG. 6, the TGA data shows a large mass loss, attributed to water loss, starting at about 320K that is finished by about 420K. The emulsions are 80% water, while the mass loss at the TGA observed plateau at 420K is approximately 79% giving good agreement with the expected water mass loss. The glycerin boiling point is typically 563 K,[35] and a mass loss is observed from 420-500 K, is attributed to glycerin which is 20% of the emulsion formulation, compared to an observed TGA loss of 21%.

The remaining mass of 0.3% and is attributed primarily to the inorganic fraction of the UCNPs (i.e., UCNP without capping ligands).

Examination of the mass curves indicates that most, if not all, of the loss happens over the first four days. Given the scatter in the data, it is not clear that there is any trend of UCNP loss over the 4-11 day testing period. A notable clearing of the emulsion was observed over the first day after formulation, which corresponds well with the mass loss observation in FIG. 7 below.

Example 3

Ink Stability Testing.

Figure 7:
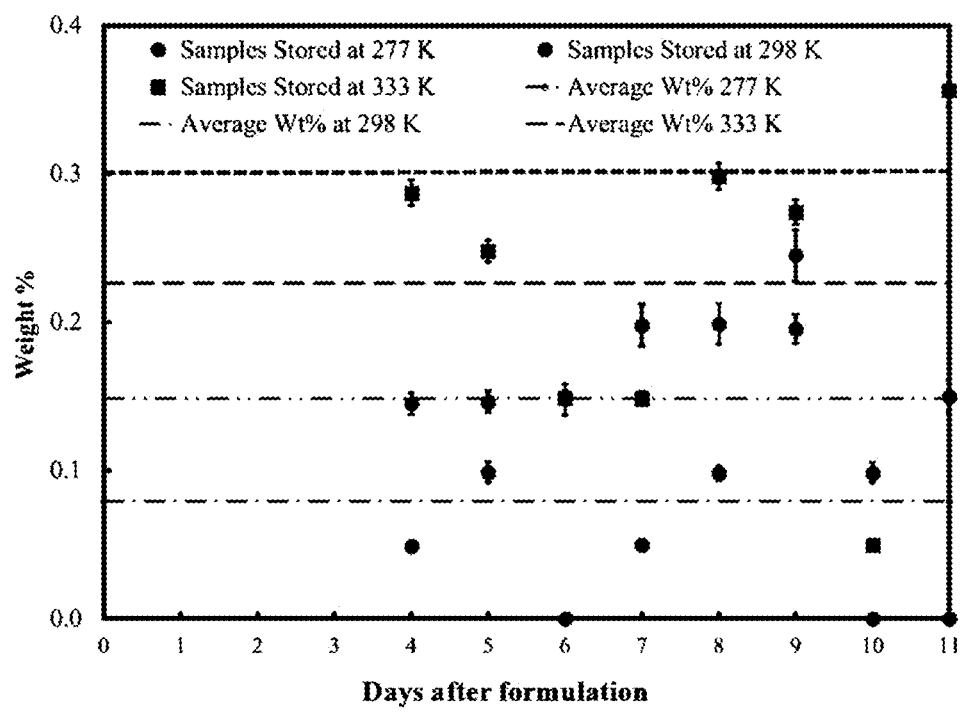
FIG. 7 shows weight percentage of remaining residue of ink sample after heating to 823 K for inks stored at 277K, 298K, and 333K.

To determine the short-term stability of the UCNP containing emulsions, the weight percent of nanoparticles in the emulsion was determined as a function of the number of days following formulation for storage temperatures of 277K, 298K and 333K. The testing procedure is based on monitoring the concentration of UCNP in the upper fraction of an ink sample in an undisturbed container. A clean glass slide was placed on a balance and its mass was recorded. 200 µL of ink was pipetted as closely as possible from the top of the ink container onto the glass slide and the total mass of slide and ink was recorded. The glass slide was then removed from the balance and placed on a clean hot plate set to 368K for 7-10 min to allow the water component of the ink to evaporate. The slide was then transferred to a hot plate maintained at 823K where the remaining organic components were removed within 7-10 minutes. Once there was no longer any liquid material remaining, tweezers were used to remove the glass slide from the hot plate. After cooling, the sample was returned to the balance and weighed. The results of these tests are shown in FIG. 7.

The error bars indicate one standard deviation in % of the mass of 200 µL of ink at the given temperature and indicates the reproducibility of the ink removal and weighing process.

Examination of the mass curves indicates that most, if not all, of the loss happens over the first four days. Given the scatter in the data, it is not clear that there is any trend of UCNP loss over the 4-11 day testing period. Consistent with extended DLVO theory, the samples kept at the coldest temperature (277 K) showed the greatest loss of nanoparticles at 73.6%, while the ambient temperature conditioned emulsions lost on average 50.6% of the nanoparticles. At the highest storage temperature considered (333 K), nanoparticle loss was 24.7% on average over the 11 days of testing.

Example 4

Desktop Inkjet Printing.

To assess printability, the surface tension was measured. A Rame-Hart Advanced Goniometer-Tensiometer Model 500 was used to measure surface tension. Reported values are the averages of three trials for each sample. A Bohlin Instruments CVOR Shear Rheometer was used to measure viscosity at 298K. Reported values are the averages of three measurements. The average surface tension of UCNP inks was found to be 37.4±0.4 mN/m four days after emulsion formulation. The average viscosity for the 0.3 wt % UCNP inks was found to be 1.35±0.03 cP four days after formulation. These measurements coincide with thermal inkjet printing parameters, thus making them amenable for printing. As these values fell within the typical printing parameters for inkjet printing, test printing was performed.

Two commercially available desktop printers were used in this example. NIR-to-green UCNP inks were printed using an Epson WF-3620; and NIR-to-NIR UCNP inks were printed using an Epson XP-430. Following formulation, the UCNP inks were left in the vials undisturbed for 24 hours. Then, the ink was drawn out carefully leaving the bottom ~0.5 mL to avoid settled material. This ink was then pipetted into an empty print cartridge and installed into the Epson printer and tested for printing. The NIR-to-green UCNP ink remained in the printer for seven months, with longest gap between printing being two months. No clogging issues were observed over the seven month period. The NIR-to-NIR UCNP ink was studied for two weeks. The UCNP ink-filled cartridges were not disturbed during the test period.

Two cameras were used for imaging. NIR-to-green UCNP ink printed samples were imaged using a Nikon D3000 DSLR with an AF-S DX Micro-NIKKOR 40 mm f/2.8G Macro Lens with a UV/IR filter. NIR-to-NIR UNCP ink printed samples were imaged using Nikon D3100 DSLR (IR filter removed) with an AF-S DX Micro-NIKKOR 40 mm f/2.8G Macro Lens with an 850 nm shortpass filter. The printed samples were excited with a 980 nm CW laser for imaging. NIR-to-green UCNP ink printed samples were imaged using a laser power density of 20 W/cm$^2$ (raster scanned); the camera parameters used were 15 s exposure time, ISO 1000, aperture size f3.4. NIR-to-NIR UNCP ink printed samples were imaged under a laser power density of 1.4 W/cm$^2$; the camera parameters used were a is exposure time, ISO 400, aperture size f3.4. The results of the printing are shown below in FIGS. 8A-9 providing photographs of the printed paper and images of the upconverted ink on the paper.

FIGS. 8A, 8B, and 8C show NIR-to-green upconversion ink (0.3 wt %) on paper printed using Epson WF-3620. This testing was not only performed to assess the printability of the upconverion inks, but also the stability of the upconverion inks over time. The upper photographs show the printed regions under ambient room lighting. The lower photographs are the NIR-to-green luminescence upconversion images of the printed regions under NIR excitation (980 nm; 20 W/cm$^2$). As can be seen in the top images, no ink is visible on the paper; however, the printed ink appears after upconversion as shown in the lower portion of the figure. The upconverion ink was formulated and added to an ink cartridge and the ink cartridge was placed in the Epson printer. FIG. 8A shows a image printed the day the ink formulated. The ink cartridge was left to store in the printer to assess the stability of the upconversion inks both in terms of printability and excitability after storage and non-use in the cartridge. FIG. 8B was printed 134 days (4 months and 2 weeks) after the ink was formulated. FIG. 8C was printed 212 days (7 months and 2 days) after the ink was formulated. As can be seen by comparing FIGS. 8A-8C, the upconversion ink remained stable over this lengthy period of time. The ink remained stable both for printing and upconversion. Little difference was observed over the testing period in the upconversion intensity obtained using the same laser excitation power and camera settings.

Similarly, FIG. 9 shows NIR-to-NIR (0.3 wt %) ink, formulated with 75 nm β-NaYF$_4$: 48% Yb, 2% Tm UCNP, printed on paper printed using Epson XP-430. The sample in FIG. 9 was printed 60 days after the ink was formulated and added to the print cartridge. The photograph is of the left is the latent print image under ambient lighting. The photograph of the right is the NIR-to-NIR (800 nm) luminescence upconversion images of the printed regions under NIR excitation (980 nm; 1.5 W/cm$^2$). Again, the photograph of the paper (left image) shows no ink visible on the paper;

however, the printed ink appears after upconversion as shown in the right portion of the figure. The upconversion emission signal from the patterns printed with NIR-to-NIR UCNP inks are an order of magnitude brighter than those produced with the NIR-to-Green UCNP inks. A luminescent image of NIR-to-NIR UCNP ink patterns, as shown in the FIG. 9, could be captured using a laser power density of only 1.5 W/cm$^2$, with an exposure time of 1 s and ISO setting of 400. In contrast, the NIR-to-Green images in FIGS. 8A-8C was captured using a laser power density of 20 W/cm$^2$, an exposure time of 15 s and ISO setting of 1000 for green UCNP. In addition, the NIR-to-NIR UCNPs used here were of 75.5 nm×54.8 nm (slightly bigger than green UCNPs) in size and did not clog the printer for two months of the testing period which demonstrates that different sized UCNPs used here are sufficiently small for printer orifices.

The inventions being thus described, it will be obvious that the method may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. An oil-in-water emulsion composition comprising:
an oil phase comprising a fatty acid, a phospholipid surfactant, or a mixture thereof; a sorbitan ester surfactant, a polysorbate surfactant, or a mixture thereof; and an upconverting nanoparticle (UCNP); and
a water phase comprising water, a water miscible liquid, or mixture thereof;
wherein the emulsion composition further comprises a secondary surfactant comprising an anionic alkyl sulfate surfactant;
wherein the emulsion comprises droplets of the oil phase dispersed in the water phase;
wherein the phospholipid surfactant is one having Formula I, Formula II, or a mixture thereof:

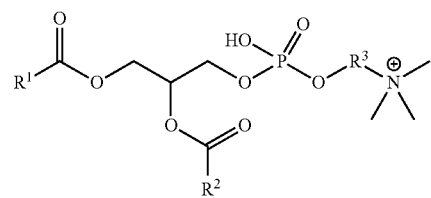

FORMULA I

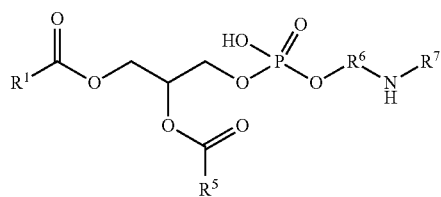

FORMULA II wherein $R^1$, $R^2$, $R^4$, and $R^5$ are independently $C_8$-$C_{25}$ alkyl, alkenyl, or alkynyl group; $R^3$ and $R^6$ are independently $CH_2$, $CH_2CH_2$, $CH_2CH_2CH_2$, $CH_2CH_2CH_2CH_2$ group; and $R^7$ is a polyethylene, polypropylene, or methoxyopolyethylene group.

2. The emulsion composition of claim 1, wherein the upconverting nanoparticle is present in a concentration of from about 0.1 wt. % to about 20 wt. % of the emulsion composition, and comprises a lanthanide, yttrium, or a combination or mixture thereof.

3. The emulsion composition of claim 1, wherein the upconverting nanoparticle is a β-Na(RE)F$_4$ nanoparticle, wherein RE comprises erbium, yttrium, thulium, or ytterbium.

4. The emulsion composition of claim 3, wherein the emulsion composition has a surface tension between about 20 mN/m and about 40 mN/m at about 298K and/or has a viscosity between about 0.5 cP and about 15 cP at about 298K.

5. The emulsion composition of claim 1, wherein in formula I, $R^1$ and $R^2$ are a linear $C_{14}$-$C_{20}$ alkyl group; and wherein the sorbitan ester is present in the oil phase and has a carbon chain length of between about 12 carbons and about 18 carbons.

6. The emulsion composition of claim 1, wherein the polysorbate surfactant is present in the oil phase and has a chemical structure according to Formula III:

FORMULA III

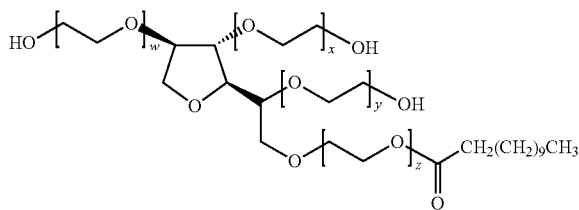

wherein each of w, x, y, and z is an integer between 1 and 40, and wherein the sum of w+x+y+z is between about 20 and about 85.

7. The emulsion composition of claim 1, wherein the phospholipid surfactant is present in the oil phase, and wherein in Formula II $R^4$ is a linear $C_{14}$-$C_{20}$ alkyl group, $R^5$ is a linear $C_{14}$-$C_{20}$ alkyl group, and $R^6$ is a $CH_2CH_2$ group or $(OCH_2CH_2)nOH$ wherein n is an integer of 1-20.

8. The emulsion composition of claim 1, wherein the fatty acid present in the oil phase, and is a $C_{14}$-$C_{20}$ saturated, monounsaturated, polyunsaturated fatty acid, or mixture thereof.

9. The emulsion composition of claim 1, wherein the oil phase comprises a mixture of the phospholipid surfactant, a polyethylene glycol amine, and the fatty acid, and wherein the water miscible liquid is present in the water phase and comprises glycerin.

10. The emulsion composition of claim 9, wherein the fatty acid is between about 1 wt. % and about 95 wt. % of the of the oil phase (not including the UCNP), the phospholipid is between about 0.1 wt. % and about 95 wt. % of the of the oil phase (not including the UCNP), and the polyethylene glycol amine is between about 1 wt. % and about 95 wt. % of the of the oil phase (not including the UCNP).

11. The emulsion composition of claim 10, wherein the polyethylene glycol amine is polyethylene glycoldistearoylphosphatidylethanolamine (PEG-DSPE), wherein the phospholipid is 1,2-distearoyl-sn-glycero-3-phosphocholine (DSPC), and wherein the fatty acid is soybean oil.

12. The emulsion composition of claim 3, wherein the upconverting nanoparticles have at least one dimension of less than about 1000 nm and are capped with a fatty acid or fatty acid salt.

13. The emulsion composition of claim 1, wherein the emulsion composition further comprises a biocide, a dye, a humectant, a pigment, a preservative, an additional secondary surfactant, or combination thereof; and wherein the emulsion composition is printable with an inkjet printer.

14. A method of preparing the emulsion composition of claim 1 comprising:
   contacting the water phase with the oil phase to form the emulsion composition, wherein the oil phase is added dropwise to the water phase.

15. The method of claim 14, wherein the method further comprises heating, mixing, and/or sonicating the oil-in-water emulsion.

16. The method of claim 15, wherein the heating, mixing, and/or sonicating step occurs during, after, or both during and after the contacting step.

17. The method of claim 14, wherein the method further comprises heating the water phase, oil phase, or emulsion composition.

18. The method of claim 17, wherein the method further comprises cooling the emulsion composition.

19. The method of claim 14, further comprising the step of adding one or more additional constituents comprising a biocide, a dye, a humectant, a pigment, a preservative, an additional secondary surfactant, or combination thereof.

20. The method of claim 16, wherein the method further comprises a resting step, where the emulsion composition is left standing undisturbed for at least about 15 minutes.

* * * * *